United States Patent
Bechtold

(10) Patent No.: US 7,882,746 B2
(45) Date of Patent: Feb. 8, 2011

(54) DEVICE WITH A RECEPTACLE FOR A LEVER

(75) Inventor: Nikolaj Bechtold, Erlangen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 373 days.

(21) Appl. No.: 12/103,202

(22) Filed: Apr. 15, 2008

(65) Prior Publication Data

US 2008/0277553 A1 Nov. 13, 2008

Related U.S. Application Data

(60) Provisional application No. 60/916,845, filed on May 9, 2007.

(51) Int. Cl.
*G01B 5/30* (2006.01)

(52) U.S. Cl. .......................................... 73/760; 73/856
(58) Field of Classification Search ............ 73/760–860
See application file for complete search history.

(56) References Cited

U.S. PATENT DOCUMENTS

| 5,203,322 A | * | 4/1993 | Isabelle et al. ............... 601/108 |
| 6,112,613 A | * | 9/2000 | Leimbach et al. ......... 74/473.11 |
| 7,716,998 B2 | * | 5/2010 | Bechtold et al. ........ 73/862.621 |

FOREIGN PATENT DOCUMENTS

| DE | 3922194 | 11/1990 |
| DE | 4102278 | 7/1992 |

* cited by examiner

*Primary Examiner*—Max Noori
(74) *Attorney, Agent, or Firm*—Volpe and Koenig, P.C.

(57) ABSTRACT

A device (1) with a receptacle (9) for a lever (2), which can at least pivot in the device (1) about a rotational axis (3, 14, 15). The receptacle (9) is spaced in the radial direction relative to the rotational axis (3, 14, 15) and can pivot with the lever (2) about the rotational axis (3, 14, 15).

18 Claims, 4 Drawing Sheets

DEVICE WITH A RECEPTACLE FOR A LEVER

CROSS-REFERENCE TO RELATED APPLICATIONS

This application claims the benefit of U.S. Provisional Application No. 60/916,845, filed May 9, 2007, which is incorporated herein by reference as if fully set forth.

BACKGROUND

The invention relates to a device for holding a lever, which can pivot or rotate with the device about a rotational axis, wherein the device is spaced apart from the rotational axis and can rotate or pivot with the lever about the rotational axis.

The subject matter of the invention relates to devices for measuring reaction moments and forces on a lever. The levers are formed, for example, as measuring beams. In this case, the measuring beams are components of the measurement device, especially for measuring torques in rotating connections. Alternatively, the levers are sections of shafts or sections on articulated shafts, which are connected in an articulated way to another section via a joint. The reaction forces or reaction moments develop as reactions to torques in rotating connections or in bearings or to bending moments in joints, when rotating connections or bearings are turned or joints are bent.

The moments of rotating connections are, for example, the torques that develop from friction and/or rolling contact in the rotating connection when two components supported so that they can rotate one on the other or one in the other, for example, the inner ring and the outer ring of a roller bearing, slide one on the other or are supported relative to each other on roller bodies arranged in-between. Here, the lever is turned about the rotational axis at least once 360°. As a rule, the torques of roller bearings should be as low as possible.

In articulated shafts of the drive train of vehicles, the bending moment is a measure for the prevailing play in the joint arrangement. However, for example, in so-called constant-velocity joints, especially in pin universal joints, the play is an evaluation criterion for the function of the articulated shaft arrangement. Unbalanced masses around the rotational axes of the articulated shaft sections can develop due to play that is too great.

The resistance at the folding point of a joint is designated as the bending moment, which is directed opposite the bending of two articulated shaft sections connected to the joint and can be detected and thus can be measured. The bending moment is dependent on the construction of the correspondingly hinged connection and is comprised, for example, from friction moments and from other resistance of the roller contact at a joint of an articulated shaft of a motor vehicle. In pin universal joints, the value of the bending moment is set at the freedom of play of the joint, i.e., the joints are installed intentionally with pre-tensioning. Friction is intentionally set, for example, between the ends of the pin joint and the bases of the universal joint bushings. Pin universal joints are hinged connections transmitting torques between two articulated shaft sections without play as much as possible in all directions. In pin universal joints, each of the articulated shaft sections is provided with a joint yoke. The two joint yokes are connected by means of a universal joint so that they can pivot about two joint axes and are supported usually with low friction as much as possible on the pin of the universal joint by roller bearings. Each of the joint axes (bending axes) corresponds to one of the pin joint axes, which are oriented perpendicular to each other and which cross at the center of the universal joint. With the measurement of the bending moment, this resistance can be tested together with other resistances, for example, from the radial roller bearings of the universal joint bushings. For this purpose, a joint section of the articulated shaft arrangement is fixed and the other pivots about one of the axes of the pin joint.

With constant-velocity joints, a hinged connection, which transmits torques and which must allow relative axial movements between the articulated shaft sections, is produced between two articulated shaft sections. For this purpose, the joints usually feature roller bodies, which are guided in raceways and on which the two joint sections roll relative to each other so that they can move in the axial direction and via which the joint sections are engaged with each other to transmit torque with a positive fit in the peripheral direction. The friction moments should be as small as possible in this arrangement.

Small play in joint arrangements is important for the function of the articulated shaft. Because the constant-velocity joints should allow axial compensation, the play is positive. Positive plays are air gaps between elements supported one on the other. These plays should be as small as possible, but should also be provided to keep the bending moments small. In contrast, in pin universal joint arrangements, the pin joint and the joint yokes are mounted, as already mentioned above, so that they can move relative to each other, without play, and with pre-tensioning. In order to guarantee freedom of play, the elements are preferably mounted relative to each other with negative play, that is, with pre-tensioning. A measure for the freedom of play or the measure for the pre-tensioning, with which the joint yokes and the pin joint are to be mounted or are assembled with each other is the bending moment, with which the pre-tensioned joint can bend about the respective joint axis. The bending moment necessary for the functioning of each articulated shaft arrangement is first determined and fixed with reference values. The reference values are then added, for example, for quality control purposes for comparison with mass-produced products.

DE 39 22 194 C1 describes a method and a device of the most general form for measuring bending moments in pin universal joint arrangements. The device is formed by a holder, with which an articulated shaft section is held stationary. The joint yoke of this joint section is oriented in the device so that the other articulated shaft section is driven by the pivot drive so that it can pivot about the joint axes of the pin joint. A bending rod, whose fibers of the outer skin are elongated or compressed as a function of bending direction and resistance of the joint, is arranged between the pivoting joint section and the pivot drive. Expansion measurement strips, with which the expansion of the fibers is detected and converted into corresponding electrical voltage magnitudes, are arranged on the outer skin.

The pivot drive is connected in an articulated way to a radial guide and then via a ball-and-socket joint to the bending rod. The radial guidance can pivot with a pivoting angle of 90° about the rotational axis of the articulated shaft arrangement in the sense of rotation by means of the pivot drive.

With the method described in DE 39 22 194 C1, counteracting bending moments about the two joint axes when the moving joint section bends relative to the rigid joint section are measured. For this purpose, the radial guidance is pivoted about the rotational axis on an arc by 90° in the sense of rotation by means of the pivot drive. Here, the counteracting bending moments on the joint axes are first detected in the form of tension magnitudes on the expansion measurement strips of the bending rod. These tension magnitudes are proportional to the bending moments, are recorded, and are selectively converted and displayed legibly in a display device.

DE 41 02 278 A1 shows and describes a device for measuring forces and moments in articulated shaft arrangements with constant-velocity joints. This device has a stationary receptacle, in which one of the joint sections is held rigidly. The other articulated shaft section can pivot relative to the fixed articulated shaft section by means of the joint. A device for measuring the force-path, in which the pivoting articulated shaft section is held, is arranged on the pivot axis between the contact of the pivot drive and the joint. The receptacle, in which the pivoting articulated shaft section is held, is movable with the articulated shaft section. Radial movements and pivoting movements are converted at force-path sensors (force measurement sensors) into corresponding signals, which represent the bending moment on the joint. The bending moments are translated as deflections of the receptacle, which are caused in the device by reaction forces to the moments on the bearing.

If the pivoting articulated shaft section is bent and simultaneously pivoted about the rotational axis, due to tolerance-specific dimension, shape, and position deviations from the desired values in the articulated shaft arrangement and/or the device, the effective measurement distance between the pivoting drive and the joint or between the receptacle in the measurement block and the pivot drive is changed as a function of the bending angle or an attempt to realize this change. This can lead to axially directed constraining forces in the arrangement. Both the distance changes and also the constraining forces can falsify the measurement results. Shape and position changes, for example, deviations of the concentricity of the rotational axes of the articulated shaft sections or alignment errors between the rotational axes and the longitudinal axis of the receptacle in the measurement block, can lead to alternating constraining forces, for example, twisting of the articulated shaft section in the device. In other cases, the play between the receptacle and the articulated shaft section can be too large, so that the articulated shaft is movable for measurements within the play in the device with the corresponding disadvantageous effects on the measurement result.

SUMMARY

The pivoting or rotating lever or the pivoted joint section should be held in these receptacles ideally as free as possible from restoring forces and constraining moments, which result from the influences of dimension, shape, and position deviations of the individual components and/or the assembly. In addition, the measurement device should be free from restoring forces from the restricted guidance, jamming, or friction from the measurement arrangement.

The invention provides a device with a receptacle, in which a lever and especially a pivoted joint section can be held as much as possible free from restoring forces from dimension, shape, and position deviations of the individual components of the articulated shaft arrangement relative to each other and also free from restoring forces from the restricted guidance, jamming, or friction.

The lever according to the invention can at least pivot, and is supported in the device on a ball. "Can at least pivot" means that this device is provided for measurements with pivot angles of the lever about the rotational/pivoting axis of <360° and/or >/=360°. These measurements can be performed on joint arrangements, pivoted about horizontally or vertically or some other way oriented rotational axes. The ball receives the weight of the pivoting articulated shaft section.

The support is point-shaped due to the curved surface of the ball, so that little friction is produced in the contact between the lever and the device. If the pivoting lever is bent or pivoted about the rotational axis, due to tolerance-specific dimension, shape, and position deviations in the device, the effective measurement distance between the pivoting drive and the rotating connection or between the joint/receptacle and the pivoting drive is changed as a function of the bending angle. The lever and the receptacle are in this case free from constraining forces, which could disadvantageously falsify the measurement results, because the arrangement can avoid the constraining forces due to the point-shaped support on the ball. The lever is supported on the ball so that it is displaceable longitudinally in the direction of its rotational axis. The use of two or more balls, which are arranged in the device either one behind the other in the longitudinal direction parallel with the rotational axis and/or which are supported on the peripheral side of the lever. The weight of the lever is distributed according to the number of balls.

One embodiment of the invention provides, apart from the so-called first ball(s), on which the lever is supported, additional balls, on which the pivoting lever is guided so that it can move longitudinally without these balls being loaded with portions of the lever weight. These balls designated as second balls are preferably arranged one opposite the other, so that the lever is guided displaceably between these balls with low friction longitudinally parallel with the rotational axis, for example, for compensating the dimension, shape, and/or position deviations.

At least one first and/or second ball is tensioned in a spring elastic way against the lever. Each lever is supported by one or several spring elements on the housing of the receptacle. The spring-elastic bearing of the ball in or on the device has the advantage that the device is not that susceptible to shocks and vibrations from the outside, because vibrations can be damped by the spring arrangement. In addition, the lever can be tensioned without play between at least two balls, so that any influence on measurement results due to positive play between the lever and the guides can be avoided. The arrangement can compensate for constraining movements despite the tensioning, because the tensioning/clamping is spring elastic.

Other constructions of the invention concern the support of the ball(s) in the device. For example, it is provided that the ball is supported or mounted on a bolt. The bolt axis of the bolt is directed towards the lever or towards the articulated shaft section, preferably towards the longitudinal or rotational axis, preferably so that the extension of the bolt axis intersects the longitudinal axis or rotational axis at an intersection point. With the ball, the bolt is preferably one mounting unit and can move along the bolt axis, alternately spring loaded, mounted in the device, or pressed or fixed detachably in this device. Each bolt can be replaced in case of repairs or for retrofitting the device.

The device will be retrofitted, for example, when this is to be adapted for measuring an articulated shaft arrangement with different dimensions. In this case, the position and length of the bolt, the size of the ball and/or the characteristics of the spring element can be adapted to the changed dimensions of the articulated shaft section. The bolts, which are otherwise different according to the above viewpoints, have the same shape and dimensions relative to each other where these are held in a standardized receptacle.

Other constructions of the invention concern the mounting of the first and second balls in the device or on the bolt. The balls are mounted fixed in place so that they can rotate in any direction about their center, for example, in a bearing shell, which has sliding bearing properties or which is constructed as a sliding bearing. Alternatively, the balls are supported on ball bearings in a preferably dome-shaped bearing shell. The ball bearings themselves also can rotate about their center in all directions and can preferably move within the bearing shell freely so that they can change position. The bearing quality for the pivoting articulated shaft section is increased. Friction during relative movements between the articulated shaft section and the device is nearly completely eliminated.

BRIEF DESCRIPTION OF THE DRAWINGS

The invention is explained in more detail below with reference to embodiments. Shown are.

DETAILED DESCRIPTION OF THE PREFERRED EMBODIMENTS

Figure 1:
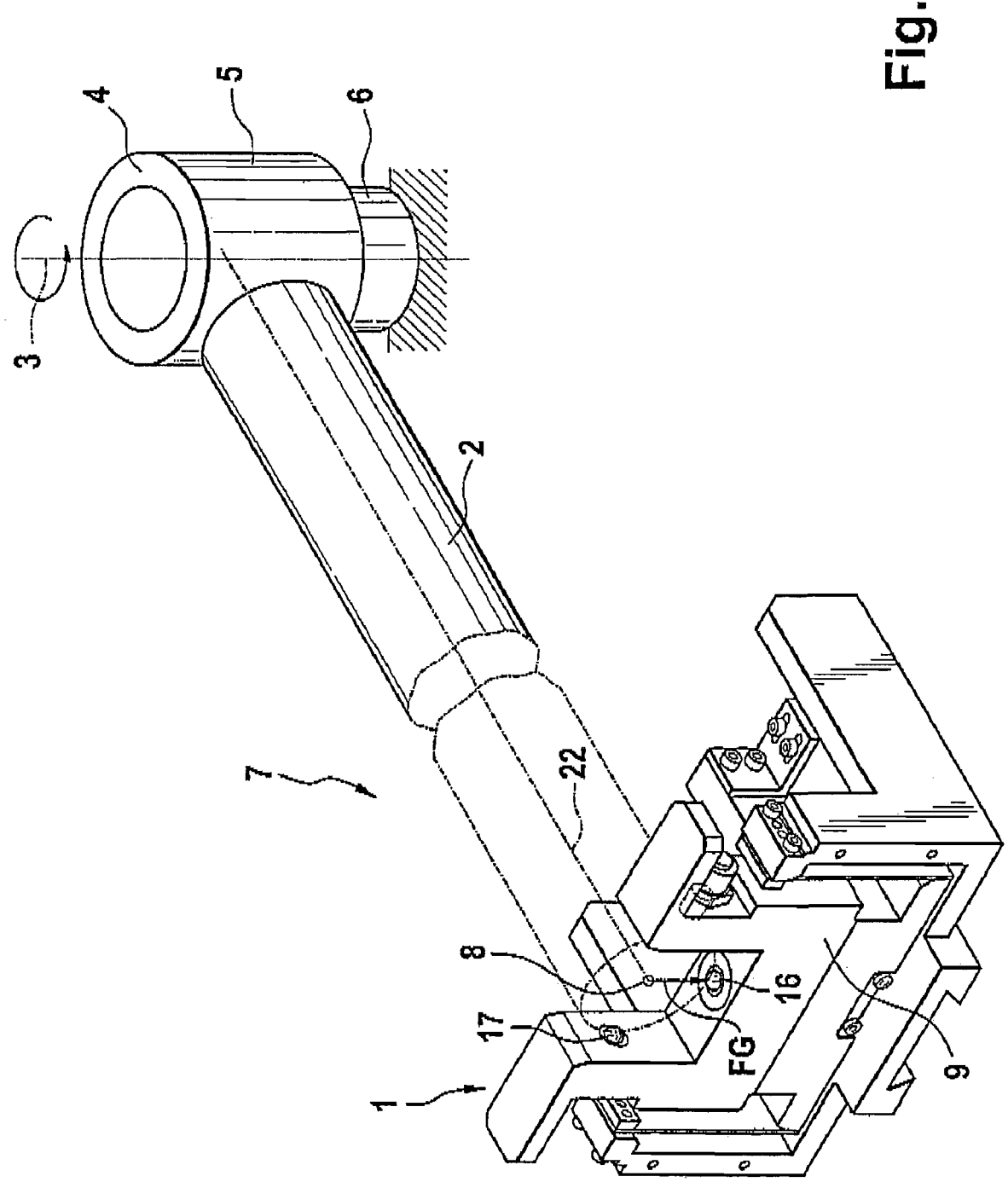
FIG. 1 is a view of a measurement arrangement with a device for measuring reaction moments and forces on a lever pivoting or rotating about a rotational axis.

In FIG. 1, a device 1 for measuring reaction moments and forces on a lever 2 is shown in a measurement arrangement 7. A receptacle 9 holds the lever 2. The device 1 with the lever 2 can at least pivot about a rotational axis 3 or can rotate about the rotational axis 3 on a circular path. The rotational axis 3 is oriented in this example horizontally, but can also be oriented vertically or in some other direction. The device 1 is spaced apart from the rotational axis 3 in the radial direction and can pivot/rotate with the lever 2 about the rotational axis 3.

The lever 2 is connected rigidly to a rotating connection 4. This rotating connection 4 can be, for example, a sliding or rolling bearing. The lever 2 is then connected, for example, to the outer ring 5 of the bearing. The weight of the lever 2 is typically supported on the pin 6, which is a component of the device 1 and is stationary on this device and on which sits the rotating connection 4 or a bearing. Because the force of gravity FG contacts the lever at a distance to the pin center (relative to the rotational axis 3), transverse forces are produced in the rotating connection 4. Such transverse forces generate additional moments, which are superimposed on the original moments of the rotating connection 4 and which are thus undesired, in the rotating connection. Therefore, the lever 2 is preferably held at its center of gravity 8 in the receptacle 9, so that the rotating connection 4 is free from the influences of the force of gravity FG.

Figure 2:
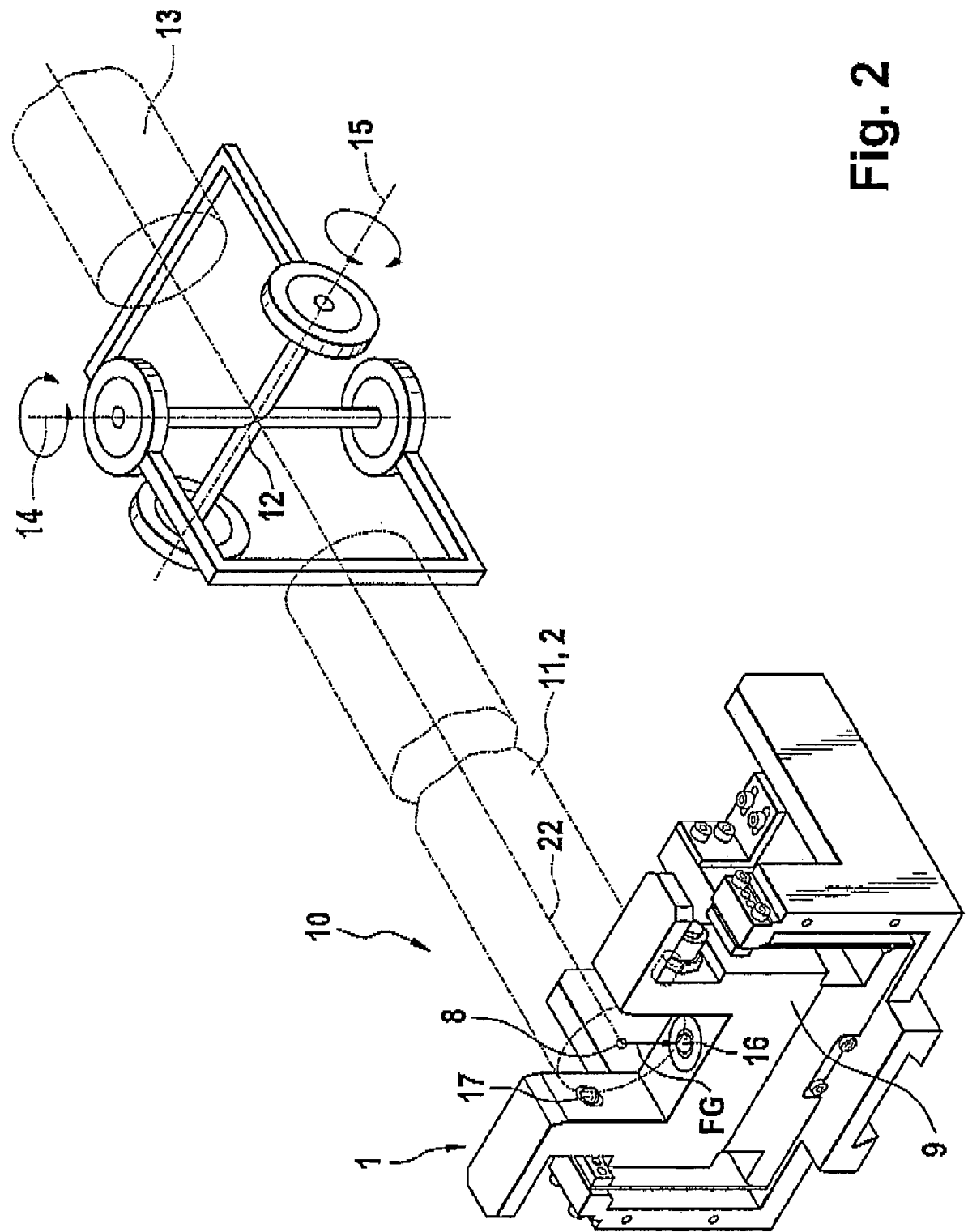
FIG. 2 is a view of the device from FIG. 1 in a measurement arrangement, in which the bending moments of an articulated shaft arrangement are measured or compared.

FIG. 2 shows the device 1 in a measurement arrangement 10 for measuring bending moments of a joint 12 in the form of a pin universal joint, which connects the two pivoting articulated shaft sections 11 and 13 in an articulated way. The lever 2 is the first articulated shaft section 11, which is connected in an articulated way by a joint 12 to a second articulated shaft section 13. In the representation from FIG. 2, the device 1 with the articulated shaft section is pivoted about the vertically oriented rotational axis 14. It is also conceivable that measurements are performed about the rotational axis 15 oriented horizontally in the representation. It is typical that measurements are first executed about the rotational axis 14 already oriented vertically in the figure, then the articulated shaft arrangement with the joint 12 is turned, so that the previously horizontally oriented rotational axis 14 becomes vertically oriented, and then the articulated shaft section is bent about the rotational axis 15 for further measurements. The device 1 prevents that the joint 12 does not buckle about the horizontal axis 15 for measurements of the torque about the vertically oriented axis 14.

The force of gravity FG of the lever 2 or the first articulated shaft section 11 is supported in the device 1 according to the invention on a first ball 16. At the side, the lever 2 or the first articulated shaft section 11 is guided and clamped between two opposing second balls 17 and 18 (see also FIG. 3). The second balls 17 and 18 transmit the reactions, which result from the torques to be measured in the measurement arrangement 10 in the rotating connection 4 or in the joint 12, to the pivoting device 1.

Figure 3:
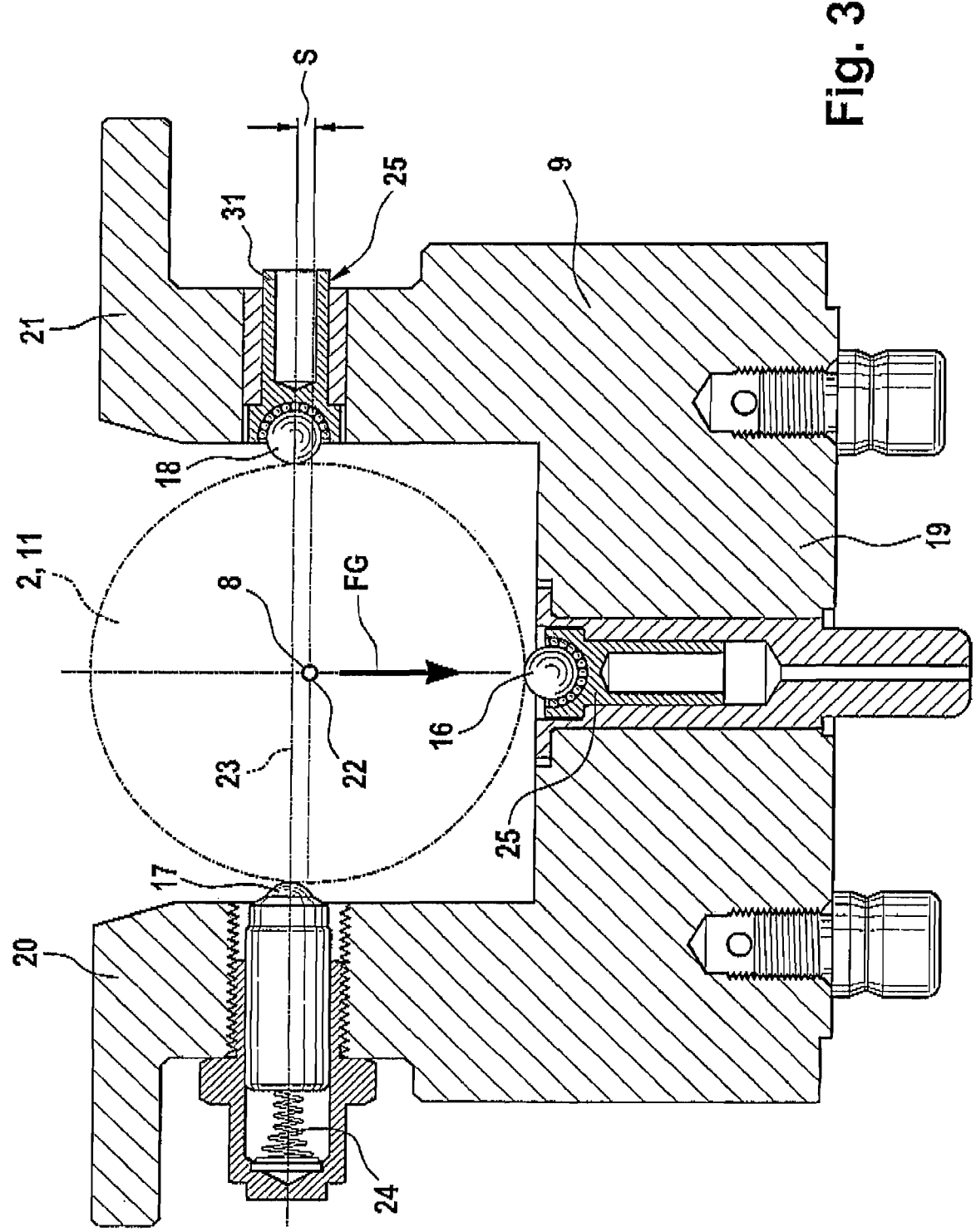
FIG. 3 is a longitudinal section view through the device from FIGS. 1 and 2, and FIGS. 4, 5, and 6 are views of different supports of the balls and bolts on the receptacle.

FIG. 3—The receptacle 9 is constructed with a U shape with a base 19 and two legs 20 and 21 projecting vertically from this base. The articulated shaft section 11 is held without constraint between the legs 20 and 21. For this purpose, balls, which can rotate relative to the device 1 in an arbitrary directional sense about their own center, are supported on the legs 20 and 21 and on the base 19. The first articulated shaft section 11 is supported on the force of gravity side at its center of gravity 8 on the first ball 16.

So that the ball 16 is mounted rotatably, the articulated shaft section 11 is mounted so that it can move longitudinally on the first ball 16 along its longitudinal axis 22 in the device 1. The longitudinal axis 22 of the articulated shaft section 11 is the axis, which intersects the rotational axis 14 in the ideal position and which is the rotational axis of the articulated shaft section 11 in the articulated shaft arrangement installed in the vehicle.

The two second balls 17 and 18 arranged at a distance to each other on the peripheral side relative to the first ball 16 about the longitudinal axis 22 of the articulated shaft section are provided for the lateral guidance of the articulated shaft section 11. The articulated shaft section 11 in this case concerns a total of three balls 16, 17, and 18 without being in contact with the receptacle 9. Because all of the balls 16, 17, and 18 are supported so that they can rotate, the articulated shaft section 11 is oriented in the device 1 nearly free from friction and is free from constraining forces.

The second balls 17 and 18 lie opposite each other so that an imaginary straight line 23 connecting their centers intersects the longitudinal axis 22. If this is not the case, and, for example, as shown in FIG. 3, there is an offset S between the longitudinal axis 22 and the straight line, this can be corrected either by raising or lowering the ball 16. Alternatively, this offset S can be intentionally generated or used in order to clamp the articulated shaft section 11 in the receptacle 9 in a better centered arrangement between the three balls 16, 17, and 18.

It is also conceivable that the balls are not opposite each other on the longitudinal axis. Imaginary straight lines originating from the center intersect the longitudinal axis at a common intersection point and enclose an acute angle in-between. It is also conceivable that the balls are not opposite each other, but instead that an imaginary straight line originating from the center of one of the two balls intersects the longitudinal axis at a different point than another imaginary straight line originating from the center of the other second balls.

One of the second balls 17 is supported in a spring elastic way on the receptacle 9. It is also conceivable that both of the second balls 17 and 18 are supported in a spring elastic way and/or the first ball 16 is supported on the receptacle 9.

Each ball 17 supported in a spring elastic way on the device can be tensioned or not in a spring elastic way against the articulated shaft section 11. If the ball(s) 11 is (are) not tensioned with the spring element 24 against the articulated shaft section 11, then each spring element 24 is a damping element, which damps vibrations of the measurement arrangement. If the ball(s) 17 is (are) tensioned against the universal shaft section 11, the universal shaft section 11 is clamped without play between the balls 17 and 18. The articulated shaft section 11 is locked between the balls 17, 18 when placed in the receptacle 9 or the articulated shaft section 11 is clamped by adding the ball(s) 17, 18 after placement.

The lever 2 or the first articulated shaft section 11 is clamped in the longitudinal direction so that it can move freely between the balls 17 and 18 and is guided on these balls like roller bearings. Deviations of the shape and position, which could lead to twisting of the lever 2 or the first articulated shaft section 11 in the device 1 or the measurement arrangement 7 or 10, are compensated in a spring elastic way, so that each arrangement is free from constraining forces.

Figure 4:
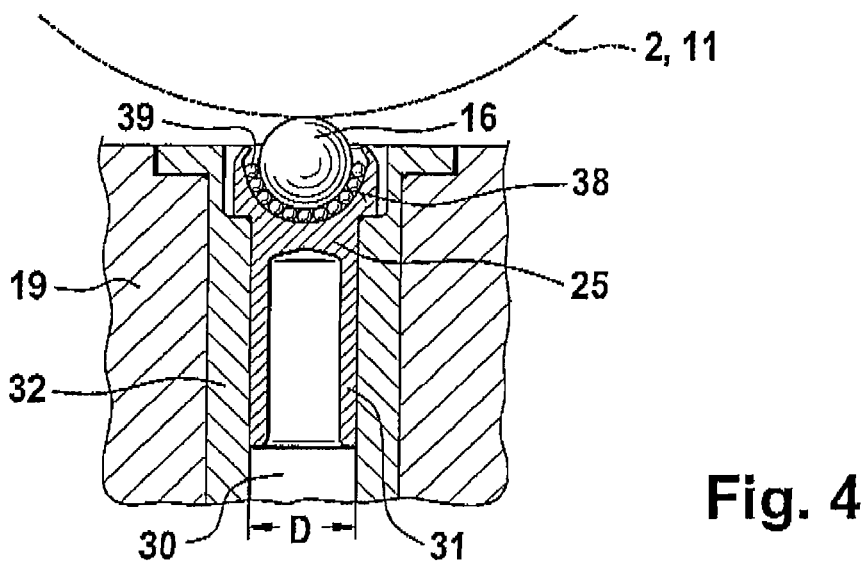
Figure 5:
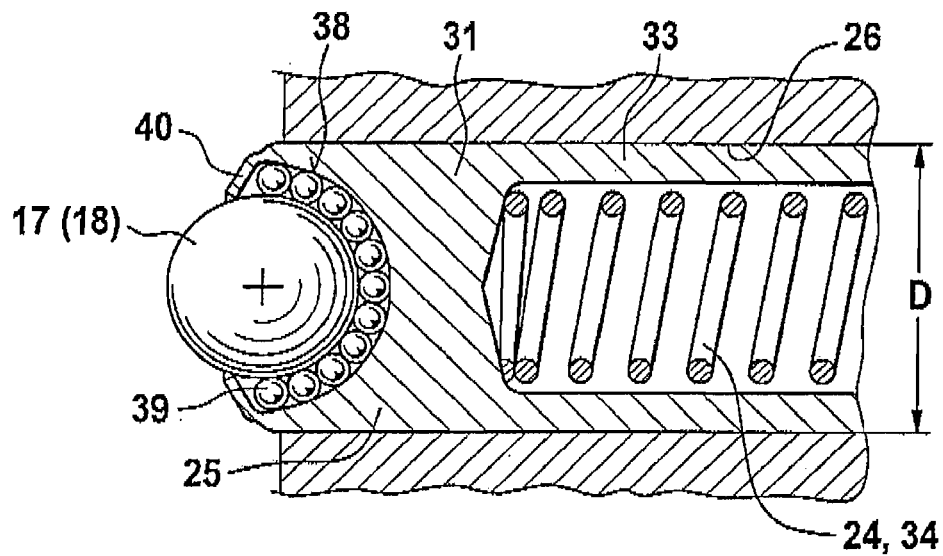
Figure 6:
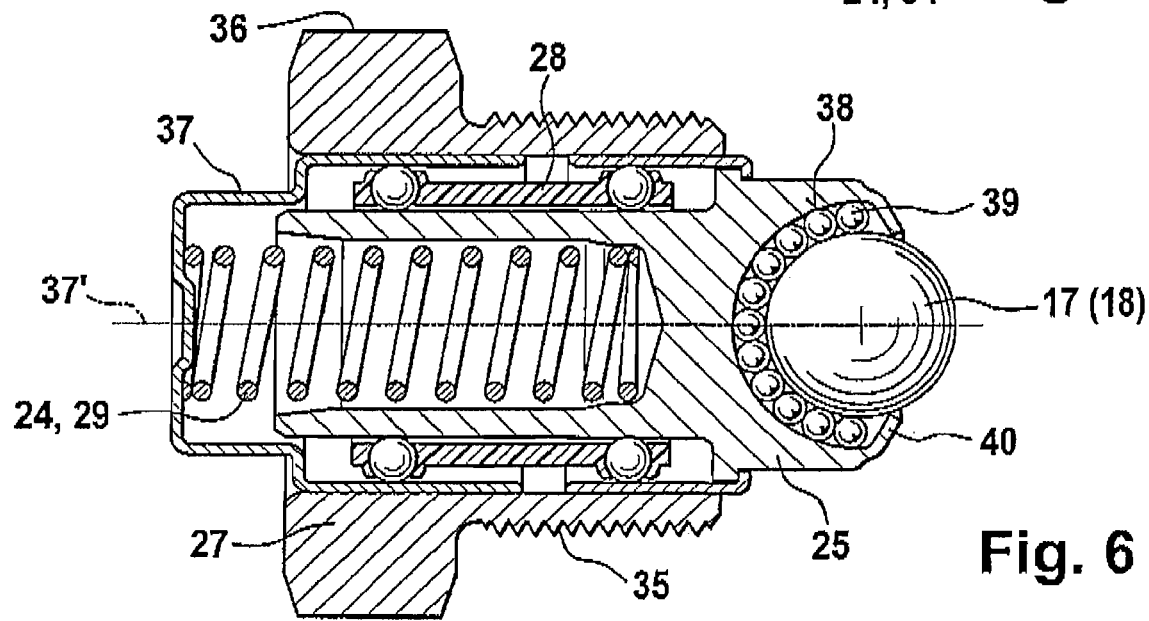

In FIGS. 4 to 6, the balls 16, 17, 18 are each held preferably on a bolt 25 and can rotate on this bolt. The bolt 25 preassembled with the respective ball 16, 17, 18 is either pressed directly into a corresponding hole 26 (detail X—FIGS. 4 and 5) or inserted displaceably (FIG. 6). Alternatively, the bolt 25 is first mounted in a housing 27 and is displaceable via a linear bearing 28, then can be tensioned in a spring-mounted way with a spring element 24 in the form of a helical spring 29 in the housing 27 and finally mounted in the device 1. It is also conceivable that the first ball 16 with the bolt 25 can be raised in the direction of the longitudinal axis 22 or lowered away from this for adjustment processes via the compressed medium. For this purpose, the bolt 25, which carries the first ball 16, can be controlled by a pressure space 30 with a compressed medium, such as oil or air.

The mounting of the balls 16, 17, and 18 on the bolt 25 has various advantages. The balls 16, 17, and 18 can be more easily displaced in the direction of the longitudinal axis 22 or away from this axis by a change in a position or length of the bolt 25. This is advantageous when retrofitting the device, for example, for shafts or articulated shafts with different diameters. In addition, the devices can be easily retrofitted for different dimensions of a wide range of articulated shafts if the bolts are exchangeable. For this purpose, the dimensions of the holes 26 or guidance of the bolt 25 and the housing 27 are standardized so that the bolts 25 are different from each other, for example, in the selection of the balls, for example, all of them have a common diameter D on the shaft 31.

In FIG. 4, a bolt 25, on which the first ball 16 is mounted, sits in a guide bushing 32. The bolt 25 is pressed with the shaft 31 rigidly into the guide bushing 32. On its side, the guide bushing sits rigidly in the base 19. Alternatively, the bolt can be charged with compressed medium on the rear side and therefore can be displaced in the guide bushing.

FIG. 5 shows a construction of the invention, according to which the first ball 16 or preferably at least one of the second balls 17 and 18 are mounted on a displaceable bolt 25. The bolt 25 is guided on a cylinder exterior and guided in a hole 26. On an end of the bolt 25 facing away from the respective ball 17 or 18 there is a hollow cylindrical section 33. The end of a helical spring 34 engages as the spring element 29 in the hollow cylindrical section 33. The helical spring 34 is supported in the hole 26 and tensioned against the bolt 25.

FIG. 6 shows a mounting-ready unit composed of the housing 27, bolt 25, ball 17 or 18, and helical spring 29, which can be screwed into the receptacle 9. For this purpose, the unit has an external thread 35 and a hexagon 36 on the housing 27. The external thread 35 fits into an internal thread of the device. For the purpose of retrofitting, various of these units can be exchanged one for the other, which do have the same dimensions in terms of the thread of the screw-in sleeve, but can differ from each other selectively in the dimensions of the bolt, spring, and balls.

A bushing 37 sits in the housing 27. In the bushing 37, the bolt 25 can be displaced along its axis of symmetry 37 by means of the linear roller bearing 28. The bolt 25 is tensioned against or in the direction of the edge of the bushing 37 by the helical spring 34 and can be spring mounted against the force of the helical spring 34 in the bushing 37.

A dome-shaped receptacle 38, which is filled with ball bearings 39, is formed on each of the bolts 16, 17, and 18. The diameter of the ball bearings 39 is smaller by a multiple than the diameter of the first ball 16 or the second balls 17 and 18. The first ball 16 receives the weight of the lever 2 or the articulated shaft section 11 and is supported on the ball bearings 39. The ball bearings 39 are supported in the receptacle 38 on the bolt 25. The second ball 17, 18 forwards the guide forces to the ball bearings 39, which are supported on their sides on the bolts 25. Alternatively, the bolts 25 are tensioned with balls 17, 18 in a spring-like manner against the lever 2 or against the articulated shaft section 11. The balls 16, 17, 18 are each held by a narrowed edge 40 of the receptacle 38 on the bolt 25.

The connection 1 is fixed on a sled 41, which can be shifted on a not-shown rail. With the sled 41, the distance between the rotational axis 3, 14, and 15 and the receptacle 9 can be adapted to levers or articulated shaft sections of different length.

REFERENCE SYMBOLS

1 Device
2 Lever
3 Rotational axis
4 Rotating connection
5 Outer ring
6 Pin
7 Measurement arrangement with rotating connection
8 Center of gravity
9 Receptacle
10 Measurement arrangement with articulated shaft
11 First articulated shaft section
12 Joint
13 Second articulated shaft section
14 Rotational axis
15 Rotational axis
16 First ball
17 Second ball
18 Second ball
19 Base of the receptacle
20 Leg of the receptacle
21 Leg of the receptacle
22 Longitudinal axis
23 Straight line
34 Spring element
25 Bolt
26 Hole
27 Housing
28 Linear bearaing
29 Helical spring
30 Pressure space
31 Shaft of bolt
32 guide bushing
33 Hollow-cylindrical section
34 Helical spring
35 External thread 36 Hexagon
37 Bushing
38 Dome-shaped receptacle
39 Ball bearings
40 Edge
41 Sled

The invention claimed is:

1. Device comprising a receptacle for a lever, which can at least pivot in the device about a rotational axis, the receptacle is spaced apart in a radial direction relative to the rotational axis and can pivot with the lever about the rotational axis, the receptacle has at least one first ball, which is separate from the lever such that it can rotate in an arbitrary directional sense about a center thereof and on which the lever is supported in the receptacle on a force of gravity side.

2. Device according to claim 1, wherein the lever is supported for longitudinal movement on the first ball along a longitudinal axis of the lever parallel to a pivoting axis in the device.

3. Device comprising a receptacle for a lever, which can at least pivot in the device about a rotational axis, the receptacle is spaced apart in a radial direction relative to the rotational axis and can pivot with the lever about the rotational axis, the receptacle has at least one first ball, which can rotate in an arbitrary directional sense about a center thereof and on which the lever is supported in the receptacle on a force of gravity side, wherein the lever is supported for longitudinal movement on the first ball along a longitudinal axis of the lever parallel to a pivoting axis in the device, the receptacle has at least two second balls, which are arranged spaced apart from each other on a peripheral side relative to the first ball about the longitudinal axis and on which the lever is supported at least in directions perpendicular to the longitudinal axis.

4. Device according to claim 3, wherein the second balls oppose each other and hold the lever therebetween.

5. Device according to claim 3, wherein at least one of the balls is supported in a spring elastic way on the receptacle.

6. Device according to claim 3, wherein at least one of the balls is supported in a spring elastic way on the receptacle, with the at least one of the balls being supported on a bolt and the bolt is supported by at least one spring elastically on the receptacle.

7. Device according to claim 3, wherein at least one of the second balls is tensioned against the lever.

8. Device according to claim 7, wherein the at least one of the second balls is tensioned in a direction of the other of the second balls in a spring elastic way against the lever.

9. Device according to claim 3, wherein at least one of the balls is supported in a spring elastic way on the receptacle and can be tensioned against the lever.

10. Device according to claim 3, wherein at least the second balls can be tensioned in a spring elastic way against the lever without play.

11. Device according to claim 3, wherein the lever contacts the second balls so that the lever can move longitudinally in parallel with the pivoting axis.

12. Device according to claim 3, wherein at least one of the balls is supported so that it can rotate about a center thereof on several ball bearings in a dome-shaped receptacle.

13. Device according to claim 3, wherein at least one of the balls is supported so that it can rotate about a center thereof on several ball bearings in a dome-shaped receptacle, and the dome-shaped receptacle is formed on a bolt.

14. Device according to claim 3, wherein at least one of the balls is supported so that it can rotate about a center thereof on several ball bearings in a dome-shaped receptacle and that the dome-shaped receptacle is formed on a bolt, and the bolt sits rigidly in a housing of the receptacle.

15. Device according to claim 3, wherein at least one of the balls is supported so that it can rotate about a center thereof on several ball bearings in a dome-shaped receptacle and the dome-shaped receptacle is formed on a bolt, and the bolt can be displaced in a direction of the lever relative to the receptacle.

16. Device according to claim 3, wherein at least one of the balls is supported so that it can rotate about a center thereof in a dome-shaped receptacle and the dome-shaped receptacle is formed on a bolt.

17. Device according to claim 3, wherein at least one of the balls is supported so that it can rotate about a center thereof in a dome-shaped receptacle and the dome-shaped receptacle is formed on a bolt, wherein the bolt is held in a spring elastic manner in a housing of the receptacle.

18. Device according to claim 3, wherein the lever is a pivoting articulated shaft section connected in an articulated way by a joint to a second articulated shaft section, in which the rotational axis is at least one pivoting axis of the joint, about which the first articulated shaft section can pivot.

* * * * *